(12) United States Patent
Makino et al.

(10) Patent No.: US 11,320,344 B2
(45) Date of Patent: May 3, 2022

(54) ASEPTIC SAMPLING FLOW PATH KIT AND SAMPLING APPARATUS USING THE SAME

(71) Applicants: NIHON KOHDEN CORPORATION, Tokyo (JP); OSAKA UNIVERSITY, Suita (JP)

(72) Inventors: Hodaka Makino, Tokorozawa (JP); Hirotsugu Kubo, Tokorozawa (JP); Masahiro Kinooka, Suita (JP)

(73) Assignees: NIHON KOHDEN CORPORATION, Tokyo (JP); OSAKA UNIVERSITY, Osaka (JP)

( * ) Notice: Subject to any disclaimer, the term of this patent is extended or adjusted under 35 U.S.C. 154(b) by 333 days.

(21) Appl. No.: 16/237,888

(22) Filed: Jan. 2, 2019

(65) Prior Publication Data
US 2019/0250073 A1  Aug. 15, 2019

(30) Foreign Application Priority Data
Feb. 14, 2018 (JP) .............................. JP2018-024393

(51) Int. Cl.
*G01N 1/10* (2006.01)
*G01N 1/44* (2006.01)
*G01N 1/34* (2006.01)

(52) U.S. Cl.
CPC .................. *G01N 1/10* (2013.01); *G01N 1/34* (2013.01); *G01N 1/44* (2013.01); *G01N 2001/1037* (2013.01)

(58) Field of Classification Search
CPC .. G01N 1/10; G01N 1/34; G01N 1/44; G01N 2001/1037
See application file for complete search history.

(56) References Cited

U.S. PATENT DOCUMENTS

| 2012/0252110 A1* | 10/2012 | Oura ...................... C12M 41/14 435/287.3 |
| 2013/0183678 A1* | 7/2013 | Haselton .......... G01N 33/54326 435/6.12 |
| 2015/0079655 A1* | 3/2015 | Laugharn, Jr. ........... G01N 1/34 435/173.7 |

FOREIGN PATENT DOCUMENTS

| JP | 2012-200239 A | 10/2012 |
| JP | 2017-185218 A | 10/2017 |

OTHER PUBLICATIONS

Office Action dated Jan. 25, 2022 by the Japanese Patent Office in counterpart Japanese Patent English Application No. 2018-024393.

* cited by examiner

*Primary Examiner* — Jennifer Wecker
*Assistant Examiner* — Oyeleye Alexander Alabi
(74) *Attorney, Agent, or Firm* — Sughrue Mion, PLLC

(57) ABSTRACT

An aseptic sampling flow path kit to be applied to an isolator having a liquid delivery port includes a sampling section, a first flow path that communicates with the sampling section, and that connects an inside of the isolator to an outside of the isolator through the liquid delivery port, and at least one one-way valve which is disposed in the first flow path, and that limits flow of fluid in the first flow path to a direction from the sampling section toward the liquid delivery port. In the kit, at least a part of the first flow path is a germicidal flow path to which a germicidal unit is applicable.

15 Claims, 4 Drawing Sheets

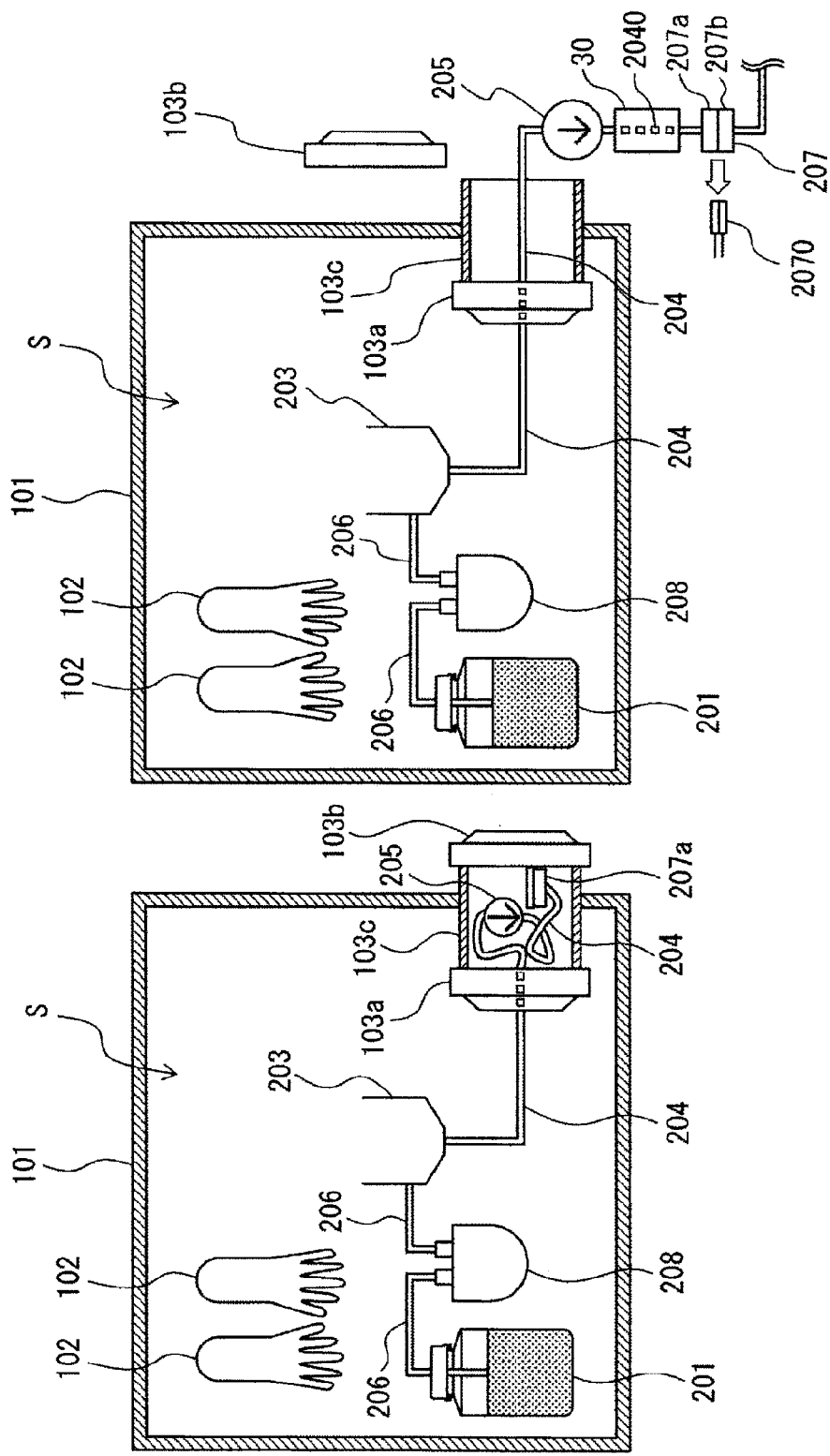

ASEPTIC SAMPLING FLOW PATH KIT AND SAMPLING APPARATUS USING THE SAME

CROSS REFERENCE TO RELATED APPLICATION

This application is based on Japanese Patent Application No. 2018-024393 filed on Feb. 14, 2018, the contents of which are incorporated herein by reference.

BACKGROUND

The presently disclosed subject matter relates to an aseptic sampling flow path kit, and to a sampling apparatus using the aseptic sampling flow path kit.

In technical fields in which cells must be cultured, such as regenerative medicine, an apparatus that cultures cells for a long term while maintaining a sterile environment has been developed. In order to check the conditions of cells which are cultured in such an apparatus, a culture solution and the like must be taken out to a non-sterile environment while maintaining sterile environment. In the case where a culture solution in a sampling apparatus is to be subjected to a sampling operation, conventionally, a sample in an incubator that is sterile space must be once carried into a pass box or the like that is disposed adjacent to the incubator to take the sample to the outside, and therefore the sampling operation is time-consuming.

As a countermeasure against the matter, a sampling system of the isolator type in which a plurality of sampling apparatuses can be accommodated in an apparatus that is maintained in a sterile environment has been proposed (for example, JP-A-2012-200239).

In the system, in order to maintain a sterile environment a one-way valve is provided to limit a flow of liquid to a unidirectional flow from the inside to the outside of an isolator, thereby maintaining sterility inside an isolator.

In the conventional sampling system, there is a possibility that, in the case where an abnormality occurs in a pump for delivering the sample from the sterile environment to the non-sterile environment, bacteria may move along a liquid phase to enter the interior of the sterile space. Therefore, the presently disclosed subject matter provides a sampling apparatus in which, even in the case where an abnormality occurs in a mechanism for delivering a sample from a sterile environment in an isolator to a non-sterile environment, the sterile environment in the isolator can be maintained, and an aseptic sampling flow path kit which is to be used in the apparatus.

The inventors have intensively studied the matter, and developed a sampling apparatus in which, even in the case where an abnormality occurs in a mechanism for delivering a sample from a sterile environment in an isolator to a non-sterile environment, the sterile environment in the isolator can be maintained, and an aseptic sampling flow path kit which is to be used in the apparatus.

SUMMARY OF THE INVENTION

The presently disclosed subject matter includes the following configurations.

[1] According to an aspect of the presently disclosed subject matter, an aseptic sampling flow path kit which is to be applied to an isolator having a liquid delivery port, wherein the kit includes:

a sampling section;
a first flow path which communicates with the sampling section, and which connects an inside and outside of the isolator to each other through the liquid delivery port; and
at least one one-way valve which is disposed in the first flow path, and which limits flow of fluid in the first flow path to a direction from the sampling section toward the liquid delivery port, and
at least a part of the first flow path is a germicidal flow path to which a germicidal unit is applicable.

[2] The aseptic sampling flow path kit according to [1], wherein the germicidal unit is a germicidal unit which uses heat or ultraviolet rays.

[3] The aseptic sampling flow path kit according to [1] or [2], wherein the germicidal flow path is a fluorine resin tube.

[4] The aseptic sampling flow path kit according to any one of [1] to [3], wherein the germicidal flow path is an FEP tube.

[5] The aseptic sampling flow path kit according to any one of [1] to [4], wherein the germicidal flow path is placed downstream of a liquid delivery port inner lid.

[6] The aseptic sampling flow path kit according to any one of [1] to [5], wherein the kit further includes a second flow path which communicates with the sampling section, and which supplies fluid from a buffer solution supplying section.

[7] The aseptic sampling flow path kit according to any one of [1] to [6], wherein the kit further includes an aseptic connection coupling in a downstream end of the first flow path.

[8] According to another aspect of the presently disclosed subject matter, a sampling apparatus includes:

an isolator;
a liquid delivery port which is disposed in the isolator;
a sampling section which is disposed inside the isolator;
a first flow path which communicates with the sampling section, and which connects an inside and outside of the isolator to each other through the liquid delivery port; and
at least one one-way valve which is disposed in the first flow path, and which limits flow of fluid in the first flow path to a direction from the sampling section toward the liquid delivery port,
at least a part of the first flow path is a germicidal flow path to which a germicidal unit is applicable, and
the germicidal unit is disposed in a periphery of the germicidal flow path.

[9] The sampling apparatus according to [8], wherein the germicidal unit is a germicidal unit which uses heat or ultraviolet rays.

[10] The sampling apparatus according to [8] or [9], wherein the germicidal flow path is a fluorine resin tube.

[11] The sampling apparatus according to any one of [8] to [10], wherein the germicidal flow path is an FEP tube.

[12] The sampling apparatus according to any one of [8] to [11], wherein the germicidal flow path is placed downstream of a liquid delivery port inner lid.

[13] The sampling apparatus according to any one of [8] to [12], wherein the sampling apparatus further includes:

a second flow path which communicates with the sampling section;
a buffer solution supplying section which supplies the fluid to the second flow path; and
a pump which is disposed in the second flow path.

[14] The sampling apparatus according to any one of [8] to [13], wherein the sampling apparatus further includes an aseptic connection coupling in a downstream end of the first flow path.

[15] The sampling apparatus according to any one of [8] to [14], wherein the sampling apparatus further includes at least one fluid detecting unit which detects a flow of the fluid in the first flow path, and a CPU unit which processes a signal that is detected by the fluid detecting unit, and, when a stop of the flow of the fluid, or an abnormality of a flow rate is detected by the fluid detecting unit, the germicidal unit is caused to operate, by the CPU unit.

According to the presently disclosed subject matter, even in the case where an abnormality occurs in a mechanism for delivering a sample from a sterile environment in an isolator to a non-sterile environment, the sterile environment in the isolator can be prevented from being contaminated, and a safe cell culture environment can be maintained.

BRIEF DESCRIPTION OF DRAWINGS

FIGS. 3A to 3D are diagrams illustrating a procedure for installation of an aseptic sampling flow path kit in the aseptic sampling apparatus of the embodiment of the presently disclosed subject matter.

DETAILED DESCRIPTION OF EMBODIMENTS

Hereinafter, the presently disclosed subject matter will be described by way of embodiments thereof. However, the following embodiments are not intended to limit the presently disclosed subject matter as defined in the appended claims, and all combinations of features described in the embodiments are not always essential to solving means of the presently disclosed subject matter.

<Sampling Apparatus>

Figure 1:
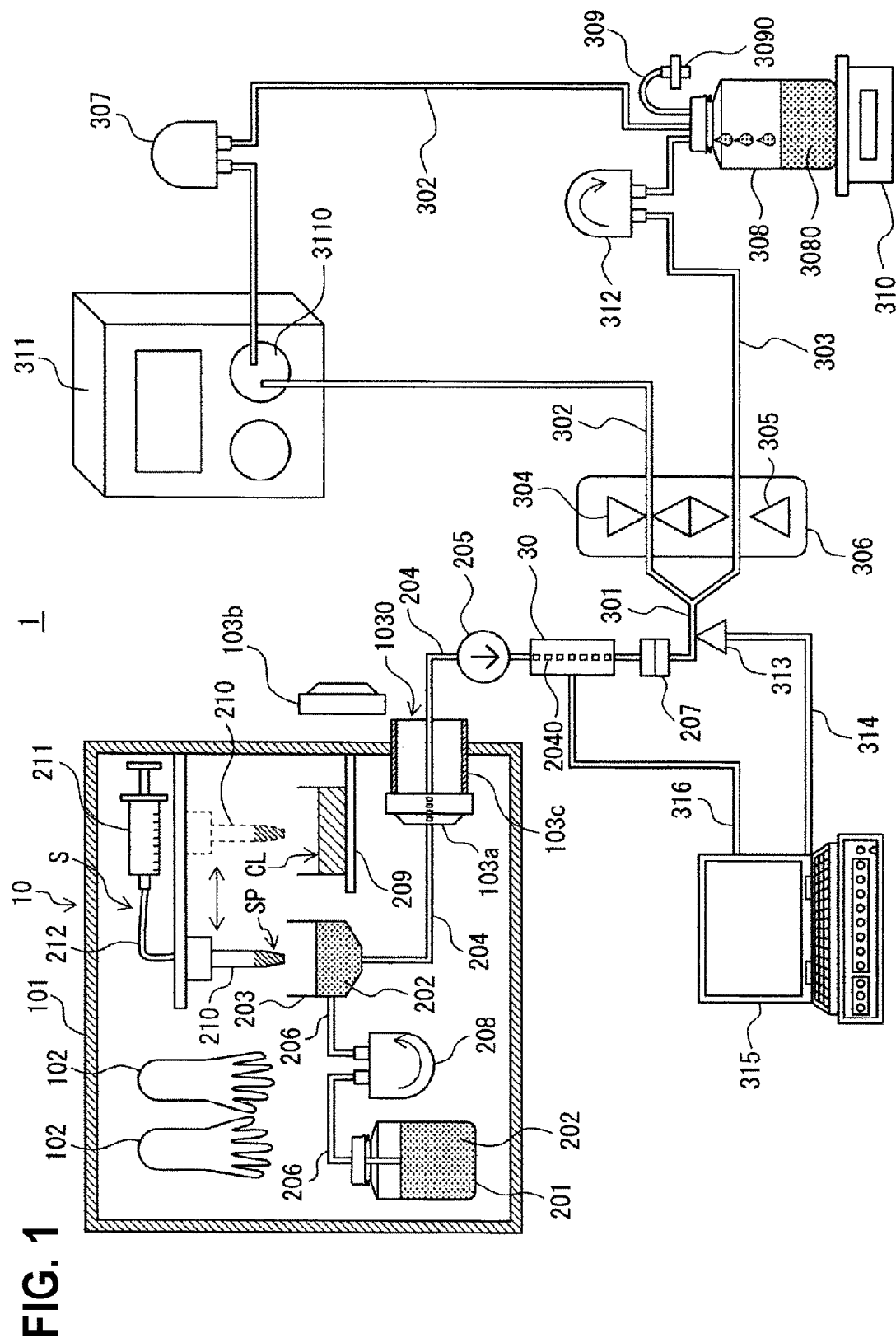
FIG. 1 is a schematic diagram of a sampling apparatus of an embodiment of the presently disclosed subject matter.

FIG. 1 is a schematic diagram of a sampling apparatus 1 of an embodiment of the presently disclosed subject matter. In the embodiment, the sampling apparatus 1 may include:

an isolator 10 which maintains the internal space in an aseptic condition;

a liquid delivery port 103 which is disposed in the isolator 10;

a sampling section 203 which is disposed inside the isolator 10;

a first flow path 204 which communicates with the sampling section 203, and which connects the inside and outside of the isolator 10 to each other through the liquid delivery port 103; and at least one one-way valve 205 which is disposed in the first flow path 204, and which limits flow of fluid in the first flow path 204 to a direction from the sampling section 203 toward the liquid delivery port 103, wherein a part of the first flow path 204 includes a germicidal unit 30.

The isolator 10 is an apparatus which has an aseptic operation area that is completely physically isolated from direct interventions of the environment and an operator. Air filtered by a HEPA filter or an ULPA filter is supplied into the isolator after decontamination to be continuously used while preventing risk of contamination from the external environment. The isolator 10 in FIG. 1 is isolated from the external space by an aseptic chamber 101, and, although not illustrated, may include a HEPA filter or an ULPA filter. Although not illustrated, the isolator 10 may further include a decontaminating unit which decontaminates the internal space S of the isolator. The term "decontamination" means a process of eliminating living microorganisms by a reproducible method, or that of reducing living microorganisms to a pre-designated level. The decontaminating unit is a unit which is used for realizing "decontamination." For example, a unit using a decontamination agent, that performing a plasma process, that using gamma rays, or that using ultraviolet rays may be employed as the decontaminating unit, but the decontaminating unit is not limited to such units. Preferably, a unit using a decontamination agent may be used. Examples of the decontamination agent are mist or vapor of hydrogen peroxide or peracetic acid, an ozone gas, a chlorine dioxide gas, and an ethylene oxide gas. When such a decontaminating unit is used, the internal space S of the isolator is decontaminated.

A liquid delivery port body 103c is disposed in the aseptic chamber 101 which isolates the inside and outside of the isolator 10 from each other. The liquid delivery port body 103c may have a cylindrical shape, or a hollow rectangular parallelepiped shape. The shape of the liquid delivery port body is not particularly limited. The inside and outside of the aseptic chamber 101 communicate with each other through the liquid delivery port body 103c. A liquid delivery port inner lid 103a and a liquid delivery port outer lid 103b can be fitted to liquid delivery port openings 1031, 1030 of the liquid delivery port body 103c, respectively to hermetically seal the liquid delivery port openings 1031, 1030. The liquid delivery port 103 may include at least the liquid delivery port inner lid 103a, the liquid delivery port outer lid 103b, and the liquid delivery port body 103c. The first flow path 204 is passed through the liquid delivery port inner lid 103a. The portion of the liquid delivery port inner lid 103a through which the first flow path 204 is passed is sealed by a sealing member or the like so that the fluid does not leak.

The first flow path 204 communicates with the sampling section 203. The sample or buffer solution 202 supplied to the sampling section 203 passes through the first flow path 204 that communicates with a bottom portion of the sampling section 203, and is then discharged. The first flow path 204 may include at least one one-way valve 205 which limits flow of the fluid in the first flow path 204 to a direction from the sampling section 203 toward the liquid delivery port 103. This can prevent the fluid from reversely flowing into the internal space S of the isolator. Preferably, the sampling section 203 is made of a material which is resistant to a sterilizing process. For example, useful are materials such as a metal (for example, stainless steel), polyethylene, polypropylene, polycarbonate, polystyrene, polyvinyl chloride, nylon, polyurethane, polyurea, polylactate, polyglycolic acid, polyvinyl alcohol, polyvinyl acetate, poly(meta)acrylic acid, a poly(meta)acrylic acid derivative, polyacrylonitrile, poly(meta)acrylamide, a poly(meta)acrylamide derivative, polysulfone, polycarbonate, cellulose, a cellulose derivative, polysilicone, glass, and ceramics.

The first flow path 204 may include a germicidal flow path 2040 to which the germicidal unit 30 is applicable. The germicidal unit 30 means a unit which can eliminate living microorganisms, or reduce living microorganisms to a pre-designated level. For example, a germicidal unit 30 that uses radiation (for example, gamma rays), electron beams, ultraviolet rays, or heat may be employed. Gamma rays are emitted when $^{60}Co$, $^{137}Cs$, or the like undergoes gamma decay. The germicidal unit 30 which uses gamma rays can damage biopolymer (particularly, DNA), and kill microorganisms. Also the germicidal unit 30 which uses electron beams is a unit that can damage biopolymer (particularly, DNA), and kill microorganisms. In the case where the germicidal unit 30 is a unit which applies heat to kill microorganisms, for example, heating to 80° C. or higher, 90° C. or higher, 100° C. or higher, 110° C. or higher, 120° C. or higher, 130° C. or higher, 140° C. or higher, or 150° C. or higher can be applied to perform sterilization. In the case where the germicidal unit 30 is a unit which applies ultraviolet rays to kill microorganisms, ultraviolet rays can damage biopolymer (particularly, DNA) of microorganisms, and kill the microorganisms. The wavelength of ultraviolet rays which is useful in the germicidal unit 30 in the presently disclosed subject matter is preferably a deep ultraviolet wavelength, 200 to 350 nm, more preferably 230 to 330 nm, and further preferably 250 to 300 nm. Ultraviolet rays which are useful in the germicidal unit 30 may be generated by using a known light source. For example, ultraviolet rays can be generated by using a light emitting diode (LED) which emits light at a deep ultraviolet wavelength. In the presently disclosed subject matter, preferably, the germicidal unit 30 can be miniaturized, and easily attached and detached. For example, the germicidal unit 30 using an LED which emits light at a deep ultraviolet wavelength is preferred.

In the case where the germicidal unit 30 is applied, the germicidal flow path 2040 is preferably formed by a material which does not prevent the disinfection effect from being exerted in the germicidal flow path 2040, and to which biological materials are hardly adsorbed. Such a material may be appropriately selected in accordance with the used germicidal unit 30. In the case where the germicidal unit 30 which uses gamma rays or electron beams is employed, for example, the germicidal flow path 2040 which does not disturb transmission of gamma rays or electron beams, and which is less deteriorated by gamma rays or electron beams may be used, and a tube which is conventionally used as a medical tube (e.g., a silicone rubber tube, a polyethylene tube, or a polyimide tube) may be employed. In the case where the germicidal unit 30 is a unit which applies heat to perform sterilization, a silicone rubber tube, a metal-made tube, a polyimide tube, a fluorine resin tube, or the like may be used as the germicidal flow path 2040. In the case where the germicidal unit 30 is a unit which uses ultraviolet rays, for example, a tube made of a material which does not disturb transmission of ultraviolet rays, and to which biological materials are hardly adsorbed, such as a fluorine resin tube (a PTFE tube, an FEP tube, a THV tube, a PFA tube, an ETFE tube, or a PVDF tube) may be employed. Preferably, an FEP tube may be employed. The inner diameter, thickness, and the like of the germicidal flow path 2040 may be adequately selected in accordance with the germicidal unit 30.

A part of the first flow path 204 may be the germicidal flow path 2040, or the whole first flow path 204 may be the germicidal flow path 2040. In the case where a part of the first flow path 204 is the germicidal flow path 2040, the flow path is coupled by known connectors. The germicidal flow path 2040 may be placed downstream of the liquid delivery port 103, or downstream of a liquid delivery port inner lid 103a. In the presently disclosed subject matter, even in the case where an abnormality occurs in a mechanism which sends the sample from the sterile environment into the non-sterile environment, the application of the germicidal unit 30 to the periphery of the germicidal flow path 2040 causes microorganisms to be dead downstream of the liquid delivery port 103, or downstream of the liquid delivery port inner lid 103a, whereby the interior of the isolator can be prevented from being contaminated.

The first flow path 204 may be directly coupled to a waste liquid tank 308, or alternatively provided with an aseptic connection coupling 207 in the middle of the flow path. In the aseptic connection coupling 207, an aseptic connection coupling (male type) 207a and another aseptic connection coupling (female type) 207b are combined with each other, membrane strips 2070 which hermetically seal openings of the aseptic connection coupling (male type) 207a and the aseptic connection coupling (female type) 207b, respectively are pulled and peeled off, and the aseptic connection coupling (male type) 207a and the aseptic connection coupling (female type) 207b are locked with each other, whereby the couplings can be aseptically coupled to each other. As the aseptic connection coupling 207, a commercially available one can be used. For example, the coupling is available from Pall Corporation (USA), Sartorius AG (Germany), Colder Products Company (USA), or the like. The aseptic connection coupling (male type) 207a and the aseptic connection coupling (female type) 207b may be exchangeably used. When the aseptic connection coupling (male type) 207a (or the aseptic connection coupling (female type) 207b) is disposed in the middle of the first flow path 204 and downstream of the liquid delivery port inner lid 103a, the flow path which aseptically connects the inside and outside of the isolator to each other can be minimized. The aseptic connection coupling 207 enables the flow path downstream of the aseptic connection coupling 207 to be freely designed.

In the embodiment, the sampling apparatus 1 may further include, in the isolator 10, a second flow path 206 which communicates with the sampling section 203, a buffer solution supplying section 201 which supplies the fluid to the second flow path 206, and a first pump 208 which is disposed in the second flow path 206. When the first pump 208 is driven, the buffer solution 202 is supplied to the sampling section 203, and the sampling section 203 and the first flow path 204 can be kept clean. In the case where the buffer solution 202 is not supplied through the second flow path 206, the buffer solution 202 may be supplied by, for example, a tip 210. For example, the first pump 208 may be a tube pump (peristaltic pump), or a piezoelectric pump, and any type of pump can be used as far as it can send the fluid. As the buffer solution 202, a solution having characteristics which suppresses a pH variation to a minimum level in order to prevent the properties of materials contained in the sample SP from being changed. For example, useful are a liquid culture medium (such as DMEM or RPM1-1640) which is used for culture of cells, a phosphate buffer solution, a Tris buffer solution, a HEPES buffer solution, a HEPPS buffer solution, a citrate buffer solution, a boric acid buffer solution, or the like. The kind of the buffer solution 202 may be appropriately selected in accordance with the kind and purpose of the sample SP to be recovered. In place of the buffer solution 202, water or a physiological saline solution may be used.

In the embodiment illustrated in FIG. 1, a fourth flow path 302 which is connected to an instrument 311 that detects various components, and a fifth flow path 303 which is connected to the waste liquid tank 308 are formed downstream of the aseptic connection coupling 207, a second pump 307 and a third pump 312 are disposed in the middles of the fourth flow path 302 and the fifth flow path 303, respectively, and the fourth flow path 302 and the fifth flow path 303 are opened and closed by a pinch valve switching device 306 so that the fluid flows through one of the fourth and fifth flow paths. When sampling is not performed, as illustrated in FIG. 1, a first pinch valve 304 is closed, a second pinch valve 305 is simultaneously opened, and the third pump 312 is driven, whereby the buffer solution 202 which is supplied to the sampling section 203 can be flowed in the form of a one-way flow from the first flow path 204 to the waste liquid tank 308 through the fifth flow path 303. In the case where sampling is to be performed, the buffer solution 202 is discharged from the sampling section 203 and the first flow path 204, the second pinch valve 305 is thereafter closed, the first pinch valve 304 is simultaneously opened, the sample SP which is recovered from cultured cells CL in a cell culturing section 209 is ejected into the sampling section 203 by the tip 210, and the second pump 307 is driven, whereby the sample SP is guided from the first flow path 204 to the fourth flow path 302, and the instrument 311 is enabled to measure the components and the like. For example, the second pump 307 and the third pump 312 may be tube pumps (peristaltic pumps), or piezoelectric pumps, and any types of pumps can be used as far as they can send the fluid.

In the embodiment of the presently disclosed subject matter, the sampling apparatus 1 may further include at least one fluid detecting unit which detects the flow of the fluid in the first flow path 204. As illustrated in FIG. 1, the fluid detecting unit may be a unit which detects the flow of the fluid, such as a liquid flow sensor 313 that is disposed in the first flow path 204. For example, the fluid detecting unit may be a sensor which senses the operation of the third pump 312, or an electronic balance 310 which detects the weight of the waste liquid tank 308, or may be a combination of these configurations. For example, a signal which is detected by the fluid detecting unit is monitored by a CPU unit (in FIG. 1, "electronic computer 315") through a cable 314 (alternatively, in a wireless manner). When a stop of the flow of the fluid or an abnormality of the flow rate is detected, the germicidal unit 30 is caused to operate through a cable 316 (alternatively, communication is conducted through wireless manner). Even in the case where an abnormality occurs in the mechanism which sends the sample from the sterile environment in the isolator into the non-sterile environment, therefore, the sterile environment in the isolator can be prevented from being contaminated, and the safe cell culture environment can be maintained. The operation of the germicidal unit 30 is limited in a case where an abnormality occurs in the mechanism which sends the sample from the sterile environment in the isolator 10 into the non-sterile environment, and thereby changes of the biological characteristics of the sample is avoidable as far as possible. The fluid detecting unit, the CPU unit, and the germicidal unit 30 are preferably independent from the power supply for the sampling apparatus 1, and preferably connected to an uninterruptible power system.

Figure 2:
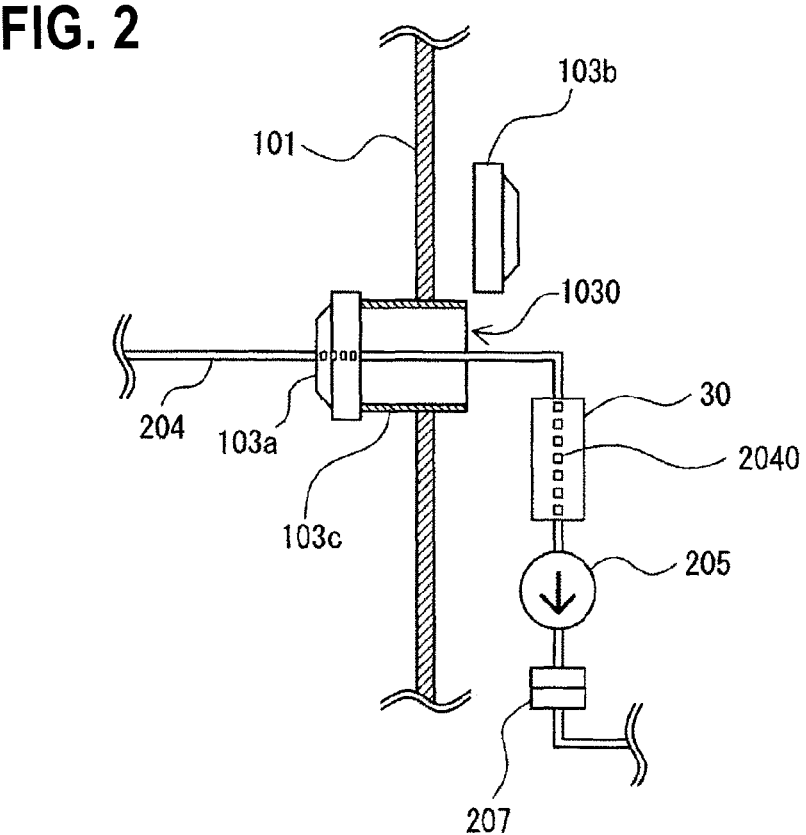
FIG. 2 is a schematic diagram illustrating a part of a sampling apparatus of another embodiment of the presently disclosed subject matter.

FIG. 2 is a schematic diagram illustrating a part of the sampling apparatus 1 of another embodiment of the presently disclosed subject matter, and illustrating a configuration where the germicidal unit 30 is applied to the first flow path 204 which is upstream of the one one-way valve 205. The germicidal unit 30 may be disposed in any portion of the first flow path 204 as far as the portion has the germicidal flow path 2040.

<Aseptic Sampling Flow Path Kit, and Method of Using It>

The presently disclosed subject matter further provides the aseptic sampling flow path kit 20 which is to be applied to the isolator 10 having the liquid delivery port 103, wherein the kit includes:

the sampling section 203;

the first flow path 204 which communicates with the sampling section 203, and which connects the inside and outside of the isolator 10 to each other through the liquid delivery port 103; and at least one one-way valve 205 which is disposed in the first flow path 204, and which limits flow of the fluid in the first flow path 204 to the direction from the sampling section 203 toward the liquid delivery port 103, and wherein at least a part of the first flow path 204 is the germicidal flow path 2040 to which the germicidal unit 30 is applicable.

Figure 3A:
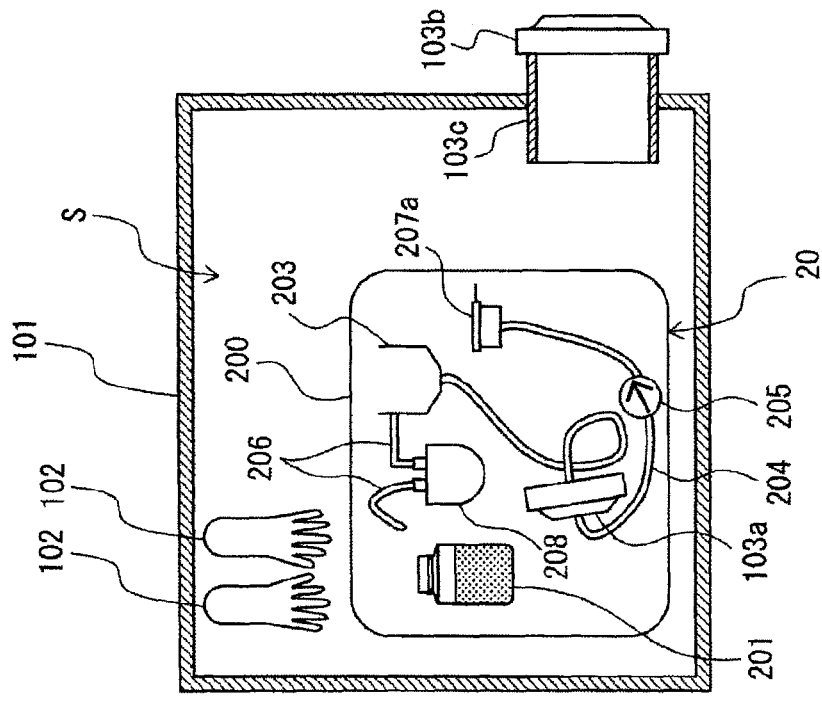

In another embodiment, as illustrated in FIG. 3A, the aseptic sampling flow path kit 20 may further include the second flow path 206 which communicates with the sampling section 203, the buffer solution supplying section 201 which supplies the fluid to the second flow path 206, and the first pump 208 which is disposed in the second flow path 206. In a further embodiment, the aseptic sampling flow path kit 20 may further include an aseptic connection coupling 207a in the downstream end of the first flow path 204. The above-described members included in the aseptic sampling flow path kit 20 may be enclosed in individual sterilization pouches 200, respectively, or collectively enclosed in the same sterilization pouch 200 as illustrated in FIG. 3A. The members of the aseptic sampling flow path kit 20 which are enclosed in the sterilization pouch 200 are previously sterilized by gamma rays, electron beams, or the like.

Figure 3B:
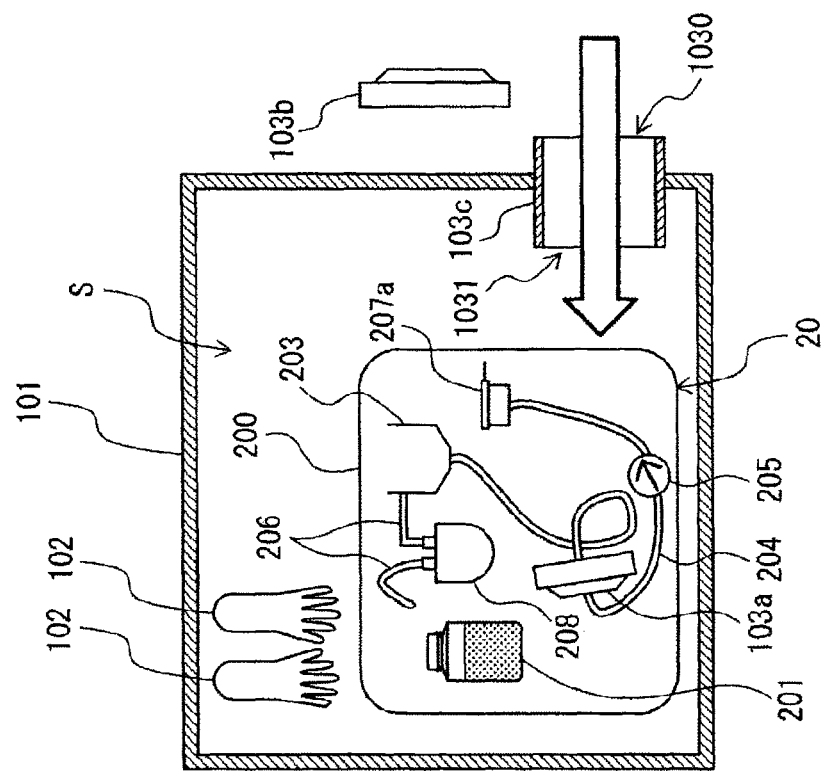

Usage of the aseptic sampling flow path kit 20 is explained below with reference to FIGS. 3A to 3D. The aseptic sampling flow path kit 20 is carried into the isolator 10 through the openings of the liquid delivery port body 103c of the isolator, or a decontamination pass box (not shown) which is additionally disposed in the isolator 10 (FIG. 3A). Thereafter, the liquid delivery port opening 1030 which is on the outer side is hermetically closed with the liquid delivery port outer lid 103b, and the interior of the isolator 10 and the aseptic sampling flow path kit 20 are decontaminated (FIG. 3B). The liquid delivery port inner lid 103a may be provided in the state where the lid is enclosed in the sterilization pouch 200 as illustrated in FIGS. 3A and 3B, or provided into the isolator 10 separately from the sterilization pouch 200.

After the decontamination is completed, the sterilization pouch 200 is opened by using gloves 102 into which the arms of the operator are insertable from the outside of the isolator 10, and the members are assembled. The first flow path 204, the one-way valve 205, and the aseptic connection coupling (male type) 207a are placed in the liquid delivery port body 103c, and the liquid delivery port body is hermetically closed with the liquid delivery port inner lid 103a through which the first flow path 204 is passed (FIG. 3C). From the outside of the isolator 10, the liquid delivery port outer lid 103b is detached, and the first flow path 204, the one-way valve 205, and the aseptic connection coupling (male type) 207a are taken out from the liquid delivery port body 103c. Thereafter, the coupling is aseptically coupled to the third flow path 301 which has the aseptic connection coupling (female type) 207b at one end, by using the aseptic connection couplings. After that, the germicidal unit 30 is set at the germicidal flow path 2040 of the first flow path 204 (FIG. 3D). With the above setting, the aseptic sampling apparatus 1 of the presently disclosed subject matter using the aseptic sampling flow path kit can be used.

Although the presently disclosed subject matter has been described by way of the embodiments, the technical scope of the presently disclosed subject matter is not restricted to the scope of the description of the embodiments. It is obvious to those skilled in the art that various changes or improvements can be made on the embodiments.

What is claimed is:

1. An aseptic sampling flow path kit to be applied to an isolator having a liquid delivery port, comprising:
   a sampling section;
   a first flow path that communicates with the sampling section, and that connects an inside of the isolator to an outside of the isolator through the liquid delivery port, wherein a part of the first flow path is a germicidal flow path to which a germicidal unit is applicable;
   at least one one-way valve which is disposed in the first flow path, and that limits flow of fluid in the first flow path to a direction from the sampling section toward the liquid delivery port; and
   an aseptic connection coupling that is disposed on a downstream side of the germicidal flow path and the one-way valve in the first flow path, the aseptic connection coupling configured to be detachably connected to another coupling outside the isolator.

2. The aseptic sampling flow path kit according to claim 1, wherein the germicidal unit is a unit which uses heat or ultraviolet rays.

3. The aseptic sampling flow path kit according to claim 1, wherein the germicidal flow path is a fluorine resin tube.

4. The aseptic sampling flow path kit according to claim 1, wherein the germicidal flow path is an FEP tube.

5. The aseptic sampling flow path kit according to claim 1, wherein the germicidal flow path is placed downstream of the liquid delivery port.

6. The aseptic sampling flow path kit according to claim 1 further comprising:
   a second flow path coupled with the sampling section, and that supplies fluid from a buffer solution supplying section.

7. A sampling apparatus comprising:
   an isolator;
   a liquid delivery port that is disposed in the isolator; a sampling section that is disposed inside the isolator;
   a first flow path that communicates with the sampling section, and that connects an inside of the isolator to an outside of the isolator through the liquid delivery port, wherein a part of the first flow path is a germicidal flow path and the germicidal flow path is disposed on a downstream side of the liquid delivery port;
   at least one one-way valve which is disposed in the first flow path, and which is configured to limit flow of fluid in the first flow path to a direction from the sampling section toward the liquid delivery port; and
   a germicidal unit that radiates at least one of radiation, electron beams, ultraviolet rays, or heat to perform sterilization to the germicidal flow path, the germicidal unit being located outside of the isolator.

8. The sampling apparatus according to claim 7, wherein the germicidal unit radiates heat or ultraviolet rays.

9. The sampling apparatus according to claim 7, wherein the germicidal flow path is a fluorine resin tube.

10. The sampling apparatus according to claims 7, wherein the germicidal flow path is an FEP tube.

11. The sampling apparatus according to claim 7, wherein the germicidal flow path is placed downstream of the liquid delivery port.

12. The sampling apparatus according to claim 7 further comprising:
    a second flow path that communicates with the sampling section;
    a buffer solution supplying section that supplies the fluid to the second flow path; and
    a pump that is disposed in the second flow path.

13. The sampling apparatus according to claim 7 further comprising:
    an aseptic connection coupling that is disposed in a downstream end of the first flow path.

14. The sampling apparatus according to claim 7 further comprising:
    at least one fluid detecting unit that detects a flow of the fluid in the first flow path; and
    a CPU unit that processes a signal that is detected by the fluid detecting unit,
    wherein, when a stop of the flow of the fluid, or an abnormality of a flow rate is detected by the fluid germicidal unit, the germicidal unit is caused to operate, by the CPU unit.

15. The sampling apparatus according to claim 7, wherein the entire germicidal flow path is located outside the isolator.

* * * * *